Figure 5:
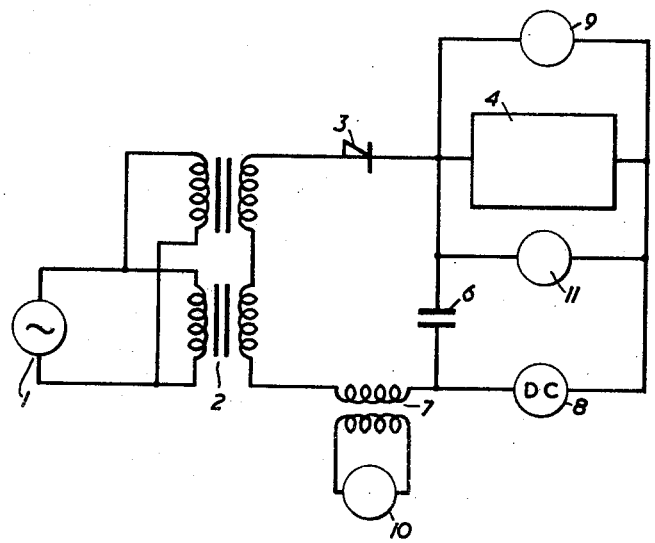

July 6, 1965     R. S. VINCENT     3,193,485
ELECTROLYTIC TREATMENT OF ALUMINIUM FOR
INCREASING THE EFFECTIVE SURFACE
Filed May 28, 1964     2 Sheets-Sheet 1
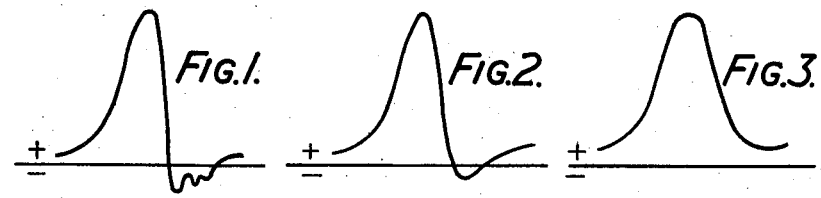
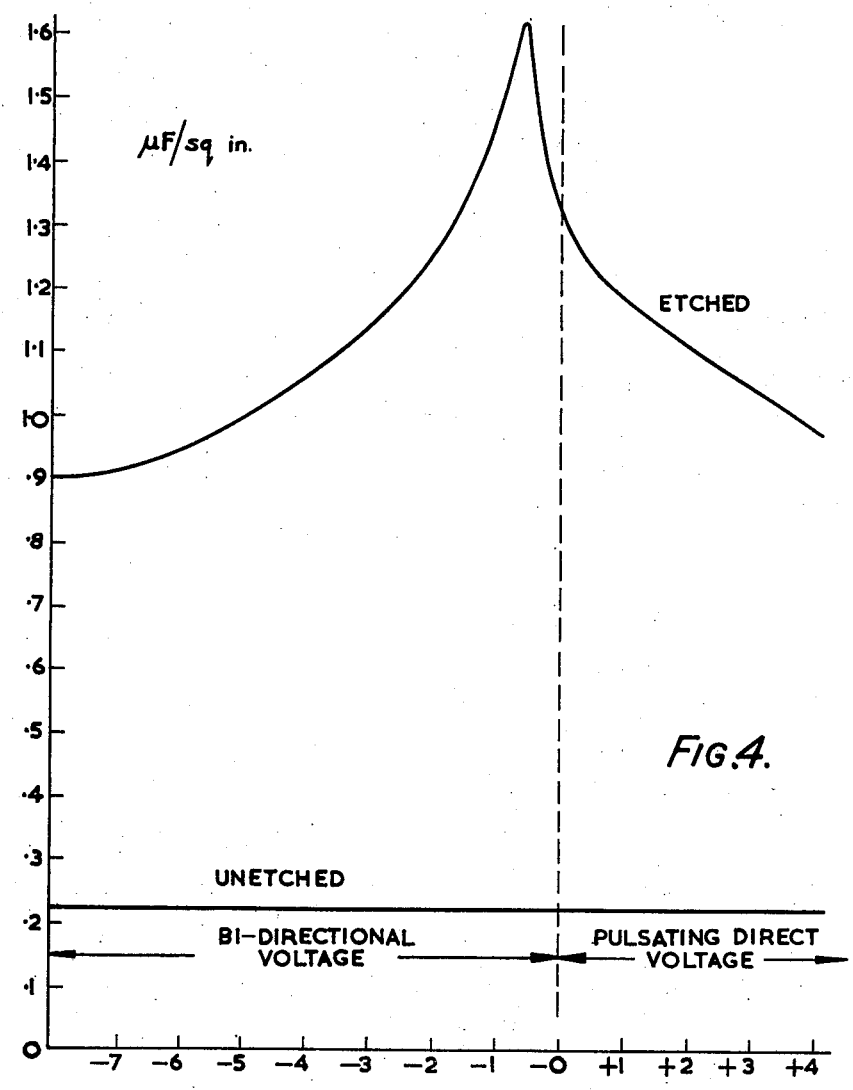

United States Patent Office 3,193,485
Patented July 6, 1965

3,193,485
ELECTROLYTIC TREATMENT OF ALUMINIUM FOR INCREASING THE EFFECTIVE SURFACE
Russell Swale Vincent, Aldbourne, England, assignor to The Plessey Company Limited, Ilford, Essex, England, a British company
Filed May 28, 1964, Ser. No. 373,128
5 Claims. (Cl. 204—141)

This is a continuation-in-part of application Serial No. 57,077, filed September 19, 1960, now abandoned.

This invention relates to the electrolytic treatment of metals, more particularly of aluminium foil, with a view to increasing their effective surface area and has for an object to provide an improved electrolytic etching method by which a very high surface increase, expressed in capacitance after formation, per square inch of foil surface can be obtained.

According to the invention the etching is effected by means of an asymmetrical alternating voltage which is such that when the aluminium or other metal foil to be treated forms an anode, by far the greater portion of a voltage wave cycle is positive-going, but which is such that successive positive-going portions are separated by short negative-going portions of considerably less amplitude than the positive-going.

The invention will now be described and explained more in detail with reference to the drawings accompanying the specification, in which FIGURES 1, 2 and 3 each depict voltage wave-forms.

FIGURE 4 is a graph showing the surface enlargement as represented by capacitance per sheet area, and FIGURE 5 is a circuit diagram of a circuit used to produce the wave-form shown in FIGURE 2.

While the results described have been ascertained with aluminium, it is believed that the invention is also applicable to other metals forming a stop layer, for example to tantalum, subject to the choice, for example, of an electrolyte suitable for the chosen metal.

In one specific example, the etching is carried out in a single step by passing the aluminium foil through an electrolytic cell in which it forms the anode and the cathode of which is a plate, or plates, of aluminium. The terms anode and cathode are here used with reference to the direction in which the current is mainly flowing. The foil is etched in a clean state but it is preferred not to carry out mechanical pre-treatment (such as scratch brushing) or thermal pre-treatment, neither of which are necessary to the success of the process. The foil may be of any purity suitable for the manufacture of electrolytic capacitor anodes.

The preferred etching voltage has a wave-form which is essentially a sine wave displaced from zero. An example of a simple circuit for producing a suitable waveform is given in FIGURE 5. In this method, the voltage waveform is generated by applying a symmetrical sine wave alternating voltage from a supply 1, through a transformer 2 and through a half wave rectifier 3. The rectifier may be, for example, of the copper oxide or silicon type. Due to the fact that rectifiers in practice pass a little current in the reverse direction this simple circuit arrangement generates a voltage across the etching bath 4 of the form shown in FIGURE 1. This waveform is modified by the connection of capacitance in parallel forming a capacitance bank and etching cell or alternatively an inductance 7 in series with it, or a combination of both as is shown in FIGURE 5, to produce the preferred simple waveform illustrated in FIGURE 2, which it has been found gives optimum results. The alternating current component through the bath is measured by a meter 10, and the alternating voltage through the bath is measured by a suitable meter 11.

Motor start capacitors rated at 150 volt R.M.S. have been found suitable for use as the capacitance bank. Addition of capacitance beyond the optimum condition produces the less effective voltage waveform illustrated in FIGURE 3 which does not offer the advantages of the present invention, being no longer an alternating voltage.

The voltage at the minimum voltage peak of the waveform has been found to be a critical factor in attaining optimum increase in the surface area of aluminium treated according to the invention. By varying the size of the capacitance bank it has been ascertained that if the minimum voltage is positive, results are relatively poor, and if the minimum voltage is too negative, results are also relatively poor. There is, however, a region of moderate negative minimum voltage which gives an outstandingly high enlargement in the surface area of the etched foil.

The graph in FIGURE 4 illustrates the performance of the process at various values of the minimum voltage. In this graph, a peak value for capacitance per square inch of etched foil is seen to occur where the foil has been etched with an alternating or bi-directional voltage rather than a pulsating direct voltage. The peak value occurs at a point where the minimum voltage of the alternating etching voltage is between —0.1 volt and —2.0 volts. For comparison, a line showing the capacity of similar unetched foil is also given. The graph is based on measurements made on a large number of samples of etched foil after being formed and aged at 500 v. D.C. in a solution of boric acid. All the foil used in this series of measurements on the etching process was of aluminium of 99.8% purity and 4 mils approximately in thickness; it was not pre-treated in any way. The process has been shown to be suitable for 99.99% purity and it is, however, believed to be applicable to any purity normally employed in the manufacture of electrolytic capacitor anodes.

Four different etching solutions were employed during the course of the etching work at various minimum voltages, and the results obtained with these were indistinguishable. The first solution used was commercial hydrochloric acid 1% by volume, in which aluminium was dissolved by means of my etching process until the pH had fallen to 3.5. The second solution tried consisted of a solution of aluminium chloride $AlCl_3$ which was added to water until the density was 1.005 grams/millilitre; this solution was ready for immediate use and required no metallic aluminium to be dissolved in it. The third solution was the same as the second except that .1% by volume of nitric acid was added to the aluminium chloride solution. The fourth solution was the same as the third except that the addition of nitric acid was .2% by volume. The total etching time for each of the samples was 3 minutes, at 90° C.

A sample of aluminium foil to be etched was immersed in the chosen electrolyte and an electrical connection from the power supply circuit similar to that shown in FIGURE 5 was made to the foil. A plate of aluminium also immersed in the bath acted as a counter electrode for the resulting etching cell. Although small electrical voltage drops can arise between, for example, an electrode and a solution in which the electrode is immersed as well as those due to electrical resistance effects across an electrolyte, errors of this sort were not found to be large enough to effect appreciably the accuracy with which the voltage measurements were made.

Current densities having a D.C. current component between 1.2 a. and 4.0 a. per square inch of untreated foil surface were used for the process. Additional experiments were also carried out as described in the following examples.

*Experiment 1*

A 400 c./s. supply of alternating current at 280 volts R.M.S. was supplied through the step-down transformer 2 to the half wave silicon rectifier 3 in series with the etching bath 4. The capacitor bank 6 across the etching bath 4 was adjusted to 138 μf., the average value of the direct current as measured on a moving coil D.C. ammeter 8 was 20 amps. The waveform of voltage across the cell as indicated by a D.C. oscilliscope 9 was as shown in FIGURE 2, the peak-to-peak voltage being 68 v. and the minimum voltage —1.0 v. When formed to 500 v., a capacitance of 1.62 μf. per sq. inch of foil area was obtained.

*Experiment 2*

The capacitance of the capacitor bank across the bath 4 was then adjusted to 176 μf., and the average D.C. current was adjusted to 20 amps. as before by adjustment of the supply voltage to the transformer 2. The new value of the peak-to-peak voltage was 66 and the minimum was raised to +.4. The voltage waveform now was as illustrated in FIGURE 3. After formation at 500 v. the capacitance obtained was 1.22 μf./sq. inch of foil.

*Experiment 3*

In a further test the capacitance of the bank 6 was reduced to 95 μf. giving again a peak-to-peak voltage of 66 v. when the average direct current was adjusted to 20 amps. The minimum voltage had now fallen to —2 volts and the capacitance after formation at 500 v., obtained was 1.30 f./sq. μinch of foil.

These experiments appeared to confirm the results given in the graph of FIGURE 4 indicating that an optimum capacitance is obtained at a predetermined negative value of the minimum voltage and this is then greater than that obtainable with either purely unidirectional current or with a more negative-going voltage form.

Further confirmation was obtained by means of experiments in which the etching apparatus was modified so that a length of foil strip could be treated in a continuous process.

*Experiment 4*

This was carried out using electrical power from a 500 c./s. supply source on aluminium foil of four mils thickness and 6½ inches in width. The linear speed of travel of the foil through the etching bath was 14 inches per minute and the average current during the etching process as measured on a moving coil D.C. ammeter was 600 a. The length of foil immersed was 32 inches. The sheet area immersed was therefore 32" x 6½"=208 square inches, having an area of untreated surface of 416 square inches. The current density was thus 600/416=1.44 a. per square inch. The reverse voltage, as indicated by a D.C. oscilloscope connected between a voltage measuring contact to the foil before it entered the etching bath and the counter electrode was —1.0 volt. The value of capacitance obtained per square inch of foil after etching was 1.61 μf. after formation and measurement both at 500 volts D.C.

*Experiment 5*

In a further experiment, the same purity of foil was used but in a width of 9/16 inch. The foil was fed at 8 inches per minute through the etching bath which carried a D.C. etching current of 40.2 a. The A.C. current was adjusted to give a minimum voltage of —0.6 volt. This was measured by a D.C. oscilloscope connected between the counter electrode in the etching bath and a tank of welded aluminium containing a cold water washing bath which immediately followed the etching bath. This washing water was found to be sufficiently conducting to give a voltage reading indistinguishable from that obtained by making connection to the voltage measuring contact used in Experiment 4. It will be appreciated that the etching current does not flow in the foil after the etching bath has been passed.

After adjusting the minimum voltage to —0.6 volt the A.C. component of the etching current measured 31.6 a. The temperature of the etching solution was 87.5° C. The etched foil was formed to 500 volts as before and when measured at 500 volts gave a capacitance of 1.62 μf. per square inch.

In this experiment, the immersed length of foil was 9.5 inches and its width unetched 9/16 inch so that the immersed sheet area including both sides of the foil was 10.6 sq. in. of unetched surface. With a D.C. component of 40.2 a. the current density was therefore $$\frac{40.2}{10.6}=3.8 \text{ a. per sq. in.}$$

of unetched surface.

*Experiment 6*

Measurements to determine the current flow during the negative-going portion of the alternating voltage cycle were made by connecting an additional oscilloscope to observe the current flowing during the etching process in a stranded copper cable leading the etching current to a contact roller over which the foil strip passed before it entered the etching bath.

The foil was the same as that used for Experiment 5 and this was passed through the etching bath at 8 inches per minute as before. During the etching of the length of foil, the voltage measuring oscilloscope connected to the aluminium washing bath indicated a minimum voltage of —0.4 volt and a peak to peak voltage of 28 volts.

The additional oscilloscope was operated to detect the negative current flowing for a short part of each cycle. With a D.C. component of 34 a. and an A.C. component of 27.2 a. the peak reverse current was 5.7 a.

The total length of the foil immersed was 10.5 inches and this was 9/16 inch in width. The area of foil undergoing treatment was thus 11.82 square inches as there are two sides of the foil. The current density at peak reverse current therefore is 5.7/11.82 or 0.48 A. per square inch. The current density of the D.C. component was 34/11.82 or 2.88 A. per square inch of unetched surface.

The foregoing descriptions of embodiments of the invention have been given by way of example only and a number of modifications can be made without departing from the scope of the invention. For instance, the circuit described is one way of obtaining an asymmetrical alternating current but one could alternatively obtain a similar result by a straight-forward addition of alternating current to direct current. Although the cathode plate in the etching bath has been described as being of aluminium this may be replaced by a cathode plate of stainless steel or other suitable material.

I claim as my invention:

1. The method of electrolytically increasing the surface area of aluminium foil which comprises advancing said foil continuously through an electrolytic cell having a cathode and an aqueous etching electrolyte, and passing a current between said foil and said cathode at an average current density of between 1.2 A. and 4.0 A. per square inch, applying an asymmetrical alternating voltage at a frequency in the hectocycle range of said foil such that during at least two-thirds of each cycle the voltage is positive-going with respect to the foil forming the anode, successive positive-going voltage pulses of an amplitude of about seventy volts being separated by short negative-going pulses of an amplitude of at least 0.1 volt and less than one-tenth of the amplitude of the positive-going pulses, such that the surface of the foil becomes etched thereby providing a foil having an enlarged surface area.

2. A method as claimed in claim 1, wherein the amplitude of the negative-going pulses is between —0.1 and —2.0 volts.

3. A method as claimed in claim 1, wherein the electrolyte comprises commercial hydrochloric acid 1% by volume in which is dissolved aluminium until the pH is 3.5.

4. A method as claimed in claim 1, wherein the electrolyte is aluminium chloride dissolved in water to a density of about 1.005 grams per millilitre.

5. A method as claimed in claim 4, wherein the electrolyte also contains 0.1% or 0.2% of nitric acid.

References Cited by the Examiner
UNITED STATES PATENTS

| | | | |
|---|---|---|---|
| 2,699,382 | 1/55 | Altenpohl | 204—141 X |
| 2,930,741 | 3/60 | Burger et al. | 204—141 X |
| 2,951,025 | 8/60 | Mostovych et al. | 204—58 X |
| 3,085,950 | 4/63 | Thomas et al. | 204—141 X |

FOREIGN PATENTS 171,149  4/52  Austria.

JOHN H. MACK, *Primary Examiner.*